Aug. 2, 1960   H. F. PARKER ET AL   2,947,264
CHAIN POWERED CONVEYORS
Filed Nov. 13, 1958
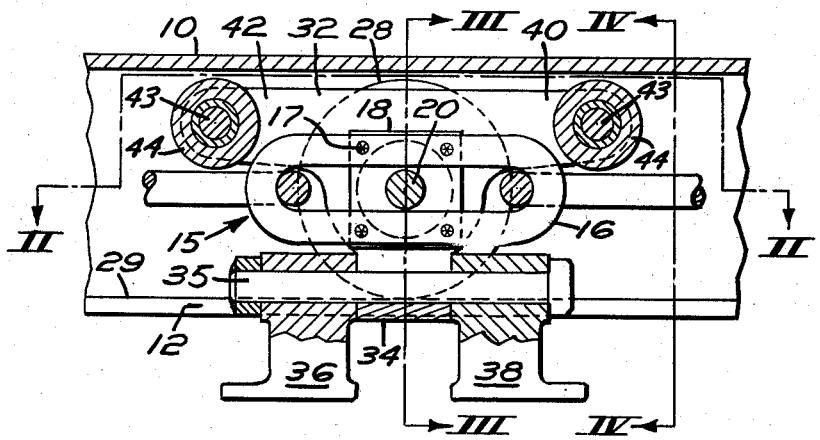
FIG. 1
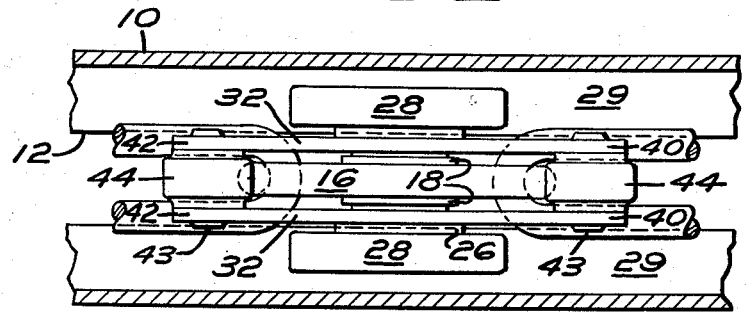
FIG. 2
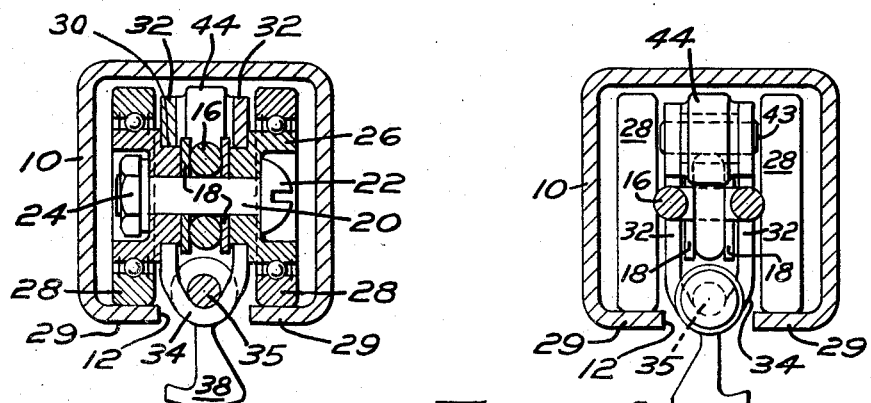
FIG. 3    FIG. 4
INVENTORS:
HUMPHREY F. PARKER
and ERFORD E. ROBINS
BY:
Beau, Brooks, Buckley & Beau,
ATTORNEYS.

United States Patent Office 2,947,264
Patented Aug. 2, 1960

2,947,264

CHAIN POWERED CONVEYORS

Humphrey F. Parker, Buffalo, and Erford E. Robins, North Tonawanda, N.Y., assignors to Columbus McKinnon Chain Corporation, Tonawanda, N.Y.

Filed Nov. 13, 1958, Ser. No. 773,677

4 Claims. (Cl. 104—172)

This invention relates to powered chain conveyors in which power chains are provided with load pick-up means for moving trolleys, trucks or other objects along trolley rails, tracks, floorways, or the like; for example as in manufacturing or warehousing operations. The power chains referred to include wheeled drive and guide links alternately disposed in vertical and horizontal attitudes to guide the chain in its travel along the track system.

One object of the invention is to provide an improved load pick-up unit in a conveyor power chain for use in conveyor systems as aforesaid.

Another object is to provide an improved load pick-up unit as aforesaid which is economical to manufacture, and which is readily assembled to provide a durable power chain and conveying unit.

Another object of the invention is to provide an improved load pick-up link for power chain conveyors, which is of self-stabilizing form.

Other objects and advantages of the invention will become apparent from the following specification, wherein the drawing illustrates various forms of the invention, and in which:

Fig. 1 is a fragmentary side elevational view of a conveyor power chain embodying the invention;

Fig. 2 is a fragmentary top plan view of the chain of Fig. 1, taken on line II—II of Fig. 1;

Fig. 3 is a sectional view taken on line III—III of Fig. 1; and

Fig. 4 is a sectional view taken on line IV—IV of Fig. 1.

Conveying systems of the type to which this invention relates include flexible power chains running in either overhead or underground trackways having load pick-up means extending from the trackway to engage load carrying racks, dollies, trolleys, or the like. For example, as shown herein the power chain supporting track is indicated at 10 to be of box-shaped cross section with the bottom wall thereof slotted as indicated at 12, so that the trackway is adapted for overhead conveyor use. However, the slot may be in the top or in either side wall of the track member, depending upon the relative position of the power chain and the work to be conveyed.

The power chain is made up of wheeled links having their wheels alternately disposed in vertical and horizontal attitudes to rollingly support and guide the chain vertically and horizontally in its travel through the track channels. Load pick-up units are interspersed throughout the length of the chain at required intervals. When the conveyor is being used in overhead relation to the workload, as illustrated for example in the accompanying drawings, the pick-up units will replace vertical guide links; giving the chain the same vertical support and guide action.

Whereas in a constantly moving conveyor system, whenever the load pick-up unit thereof encounters a stationary load and engages the same to move it along at the speed of the conveyor, the load pick-up unit is thereby subjected to forces tending to absorb the intertia of the previously stationary load. Hence, the load pick-up unit of necessity must be so constructed and arranged as to withstand the load pick-up impact without disturbance of its free running attitude in the trackway. Thus, prior load pick-up unit designs for the purposes aforesaid have usually embodied the provision of longitudinally spaced pairs of guide rollers from between which the load pick-up dog or bracket arrangement suspends, with a view to stabilizing the load pick-up unit against rocking about an axis transverse to the direction of travel, such as might otherwise cause the pick-up unit to bind in the trackway.

The present invention contemplates an improved solution of the aforesaid problem through use of a relatively simplified "single roller" type load pick-up unit, in combination with a supplemental guide device functioning to stabilize the load pickup unit in a manner superior to the results obtained by prior designs.

Thus, for example, as illustrated in the drawing herewith, a load pick-up unit of the present invention is illustrated generally at 15 to comprise a standard type chain link 16 to the opposite sides of which are welded as indicated at 17 a pair of bearing plates 18—18. The bearing plates are centrally apertured in mutual alignment to accommodate in slip-fitted relation therethrough an axle 20 which conveniently takes the form of a bolt headed as indicated at 22 and carrying at its other end a screw-thread nut 24. As its opposite ends the bolt 20 mounts the inner race or hub portions 26—26 of a pair of ball bearing wheels including outer race or rim portions 28—28. As shown more clearly in Fig. 3, the device is so arranged that the wheels 28 are disposed vertically in the trackway and vertically support the power chain by rolling contact upon the bottom flange portions 29—29, of the track 10.

Moreover, the hub portions 26 of the wheel devices are provided at their inner ends adjacent their contacts with the bearing plates 18—18, with reduced diameter shoulder portions 30 upon which suspend the opposite side arms 32—32 of a U-sectioned bracket having a bottom eye portion 34 supporting a longitudinally disposed pin 35 which in turn supports at its opposite ends a pair of load pick-up dogs 36, 38. Thus, the dogs 36, 38 are rotatably mounted by means of the pin 35, and are so shaped and arranged that when a load to be picked up is intercepted, the leading dog is tripped aside to allow the load connecting device to pass into the position between the dogs whereupon it abuttingly engages the following or driving dog. Then, the leading dog will move back under the forces of gravity to its normal position, whereby the load carrying device will be confined between the two dogs. Hence, the driving dog will now move the load to the intended transport position, while the leading dog at all times functions to prevent the load from advancing at a greater rate of speed than the power chain, such as for example when the load is being moved in a down hill portion of the trackway.

In the side elevational view, the bracket side plates 32—32 are generally T-shaped in formation, having longitudinally extending arm portions 40—42 extending substantially fore and aft of the axis of rotation of the wheels 28—28. At their front and rear ends respectively, the bracket portions support axles 43 which in turn carry rollers 44 disposed to run against the undersurface of the top wall of the trackway 10 upon any rocking of the unit about the center of the axle 20.

Thus, it will be appreciated that in the event the load pick-up dog, incidental to engagement with a load unit, transmits forces to the load pick-up units such as tend to rock the latter about the centers of the axles 20, one of the rollers 44 will be thereby moved up to roll against the top wall of the trackway 10, and will thereupon preclude further pivoting of the unit in any such manner as would cause the unit to become jammed in the trackway.

Thus, it will be appreciated that by virtue of the present invention a load pick-up unit of improved stability is provided, through use and easy assembly of the relatively few number of parts which are inexpensively fabricated. Also, it will be appreciated that the power chain unit illustrated and described herein is basically adapted to guide roller purposes also, with equal facility. In such case, the stabilizing and load dog bracket and assembly would be omitted and the link unit comprising the link 16; the bearing plates 18—18; the axle 20, and the wheels 28—28, would be readily assembled by means of the bolt 20, and would thereupon function effectively as a horizontal or vertical guide rolling unit for the power chain.

It will of course be appreciated that although only one specific form of the invention has been shown and described in detail herein, it will be apparent to those skilled in the art that the invention is not so limited but that various changes may be made therein without departing from the spirit of the invention or the scope of the appended claims.

What is claimed is:

1. A load pick-up unit for mounting in articulated connection relation in a conveyor power chain adapted to run in a guideway having a top wall portion, said unit comprising a conventional loop type chain link, a pair of bearing plates fixedly attached to opposite sides of said chain link and centrally apertured in mutual alignment, an axle journalled through the apertures of said bearing plates, a pair of wheels mounted upon opposite ends of said axle, a load engaging and stabilizing bracket device comprising a bent metal member of U-shaped form centrally apertured in alignment with the apertures of said bearing plates and engaging upon said axle, said bracket having a bottom eye portion depending below said axle and supporting a load pick-up device, said bracket having opposed side wall portions extending upwardly above the elevation of said axle and in fore and aft directions relative thereto, the fore and aft end portions of said bracket carrying roller devices therebetween, said roller devices being thereby disposed and arranged to bear against the top wall of a power chain guideway upon rocking of said unit therein about the center of said axle incidental to engagement with a stationary load or the like.

2. A load pick-up unit for mounting in articulated connection relation in a conveyor power chain adapted to run in a guideway having a top wall portion, said unit comprising a chain link, bearing means fixedly attached to said chain link and apertured to mount an axle, a pair of wheels mounted upon opposite ends of said bearing means, a load engaging and stabilizing bracket device comprising a bent metal member of U-shaped form apertured to engage upon said bearing means, said bracket having a bottom eye portion depending below said axle and supporting a load pick-up device, said bracket having opposed side wall portions extending upwardly above the elevation of said axle and in fore and aft directions relative thereto, the fore and aft end portions of said bracket carrying roller devices therebetween, said roller devices being thereby disposed and arranged to bear against the top wall of a power chain guideway upon rocking of said unit therein about the center of said axle incidental to engagement with a stationary load or the like.

3. A load pick-up unit in a conveyor power chain system including a power chain guideway having a top wall portion, said unit comprising a chain link, a pair of bearing plates fixedly attached to opposite sides of the chain link and centrally apertured in mutual alignment, an axle journalled through the apertures of said bearing plates, wheels mounted upon opposite ends of said axle, a load engaging and stabilizing bracket device comprising a member centrally apertured in alignment with the apertures of said bearing plates and engaging upon said axle, said bracket having a bottom eye portion depending below said axle and supporting a load pick-up device, said bracket having a wall portion extending upwardly above the elevation of said axle and in fore and aft directions relative thereto, the fore and aft end portions of said bracket carrying roller devices, said roller devices being thereby disposed and arranged to bear against the top wall of a power chain guideway upon rocking of said unit therein about the center of said axle incidental to engagement with a stationary load or the like.

4. A load pick-up unit for use in a conveyor power chain adapted to run in a guideway having a top wall portion, said unit comprising an assembly including a chain link, a bearing plate fixedly attached to one side of the chain link and apertured, an axle journalled through the aperture of said bearing plate, wheel means mounted upon said axle, a load engaging and stabilizing bracket device comprising a member engaging upon said axle, said bracket having a bottom eye portion depending below said axle and supporting a load pick-up device, said bracket having a wall portion extending upwardly above the elevation of said axle and in fore and aft directions relative thereto, the fore and aft end portions of said bracket carrying roller means, said roller means being thereby disposed and arranged to bear against the top wall of a power chain guideway upon rocking of said unit therein about the center of said axle incidental to engagement with a stationary load or the like.

References Cited in the file of this patent

FOREIGN PATENTS

| | | |
|---|---|---|
| 713,556 | Germany | Nov. 10, 1941 |
| 738,491 | Germany | Aug. 18, 1943 |